United States Patent
Durbin et al.

(10) Patent No.: US 7,665,308 B2
(45) Date of Patent: *Feb. 23, 2010

(54) METHODS AND APPARATUS FOR INJECTING FLUIDS INTO A TURBINE ENGINE

(75) Inventors: Mark Durbin, Springboro, OH (US); Allen M. Danis, Mason, OH (US); Timothy J. Held, Blanchester, OH (US); James N. Cooper, Hamilton, OH (US); Douglas Marti Fortuna, Cincinnati, OH (US); Daniel Durstock, Forth Wright, KY (US)

(73) Assignee: General Electric Company, Schenectady, NY (US)

( * ) Notice: Subject to any disclaimer, the term of this patent is extended or adjusted under 35 U.S.C. 154(b) by 404 days.

This patent is subject to a terminal disclaimer.

(21) Appl. No.: 11/268,183

(22) Filed: Nov. 7, 2005

(65) Prior Publication Data

US 2007/0101726 A1 May 10, 2007

(51) Int. Cl.
*F02C 3/30* (2006.01)

(52) U.S. Cl. .................. 60/775; 60/39.55; 239/549

(58) Field of Classification Search ............... 60/39.53, 60/39.55, 39.58, 39.59, 775; 239/549, 561; 431/190
See application file for complete search history.

(56) References Cited

U.S. PATENT DOCUMENTS

| | | | |
|---|---|---|---|
| 1,589,704 A | * | 6/1926 | Kenworthy ............... 239/430 |
| 6,370,862 B1 | | 4/2002 | Cheng |
| 6,434,945 B1 | * | 8/2002 | Mandai et al. ............ 60/740 |
| 6,715,295 B2 | | 4/2004 | Gadde et al. |
| 6,865,890 B2 | | 3/2005 | Walker |
| 6,935,116 B2 | | 8/2005 | Stuttaford et al. |
| 6,938,425 B2 | | 9/2005 | Simpson et al. |
| 6,968,698 B2 | | 11/2005 | Walsh et al. |
| 6,983,605 B1 | | 1/2006 | Hook et al. |
| 7,028,485 B1 | | 4/2006 | Mee |
| 7,047,748 B2 | | 5/2006 | Zauderer |
| 7,104,069 B2 | * | 9/2006 | Martling et al. ........... 60/775 |
| 7,178,339 B2 | | 2/2007 | Goldmeer et al. |
| 7,200,997 B2 | | 4/2007 | Carlson, Jr. et al. |
| 2008/0078180 A1 | * | 4/2008 | Durbin et al. ............. 60/776 |

* cited by examiner

*Primary Examiner*—Louis J Casaregola
(74) *Attorney, Agent, or Firm*—William Scott Andes, Esq.; Armstrong Teasdale LLP

(57) ABSTRACT

A method facilitates operating a gas turbine engine. The method comprises supplying steam to a nozzle, supplying primary fuel to the nozzle, discharging the steam into a combustor from a plurality of circumferentially-spaced steam outlets defined in a tip of the nozzle, and discharging the primary fuel into the combustor from at least one outlet that is spaced circumferentially between the steam outlets.

20 Claims, 4 Drawing Sheets

METHODS AND APPARATUS FOR INJECTING FLUIDS INTO A TURBINE ENGINE

BACKGROUND OF THE INVENTION

This application relates generally to gas turbine engines and, more particularly, to methods and apparatus for injecting fluids into turbine engines.

Air pollution concerns worldwide have led to stricter emissions standards both domestically and internationally. These same standards have caused turbine engine manufacturers to design more efficient engines, as well as design improved retrofit components that enable engines to operate more efficiently, with improved emissions, and/or with extended useful life and reliability. Moreover, the generally high capital costs associated with the purchase and maintenance of turbine engines, such as revenue losses generated during engine outages, have caused the same engine manufacturers to attempt to design engines that are more reliable and that have extended useful life.

Controlling the mixture of fluids, i.e. gas and steam, delivered to a gas turbine engine may be critical to the engine's performance. Typically, gas turbine engines operating with gas and steam do not meet emissions requirements at all operating conditions, and in particular, such engines generally do not satisfy carbon monoxide (CO) emission requirements as well as other known engines. For example, at least some known dual fuel gas turbine engines utilizing gas and steam generate higher CO emissions than dual fuel gas turbine engines utilizing gas and water. More specifically poor mixing of the gas and steam may cause fuel to remain inboard, leading to higher CO emissions being generated. Moreover, poor mixing may cause the recirculation stability zone within the combustor to be shifted downstream, which may cause the flame to become detached, resulting in the generation of CO emissions.

BRIEF DESCRIPTION OF THE INVENTION

In one aspect, a method of operating a gas turbine engine is provided. The method comprises supplying steam to a nozzle, supplying primary fuel to the nozzle, discharging the steam into a combustor from a plurality of circumferentially-spaced steam outlets defined in a tip of the nozzle, and discharging the primary fuel into the combustor from at least one outlet that is spaced circumferentially between the steam outlets.

In another aspect, a nozzle tip for a turbine engine fuel nozzle is provided. The tip includes an annular body including at least one pilot fuel outlet, a plurality of steam outlets, and a plurality of primary fuel outlets. The one (minimum) pilot fuel outlet is configured to discharge pilot fuel from the nozzle tip. The plurality of steam outlets are configured to discharge steam from the nozzle tip. The plurality of steam outlets are spaced circumferentially about the one (minimum) pilot fuel outlet. The plurality of primary fuel outlets are configured to discharge primary fuel from the nozzle tip. The plurality of primary fuel outlets are circumferentially aligned with the plurality of steam outlets.

In a further aspect, a gas turbine engine is provided. The engine includes a combustor and a fuel nozzle including a nozzle tip. The nozzle tip includes an annular body including at least one pilot fuel outlet, a plurality of steam outlets, and a plurality of primary fuel outlets. The one (minimum) pilot fuel outlet is configured to discharge pilot fuel to the combustor only during pre-selected engine operations. The plurality of primary fuel outlets are circumferentially aligned with respect to the plurality of steam outlets.

DETAILED DESCRIPTION OF THE INVENTION

Figure 1:
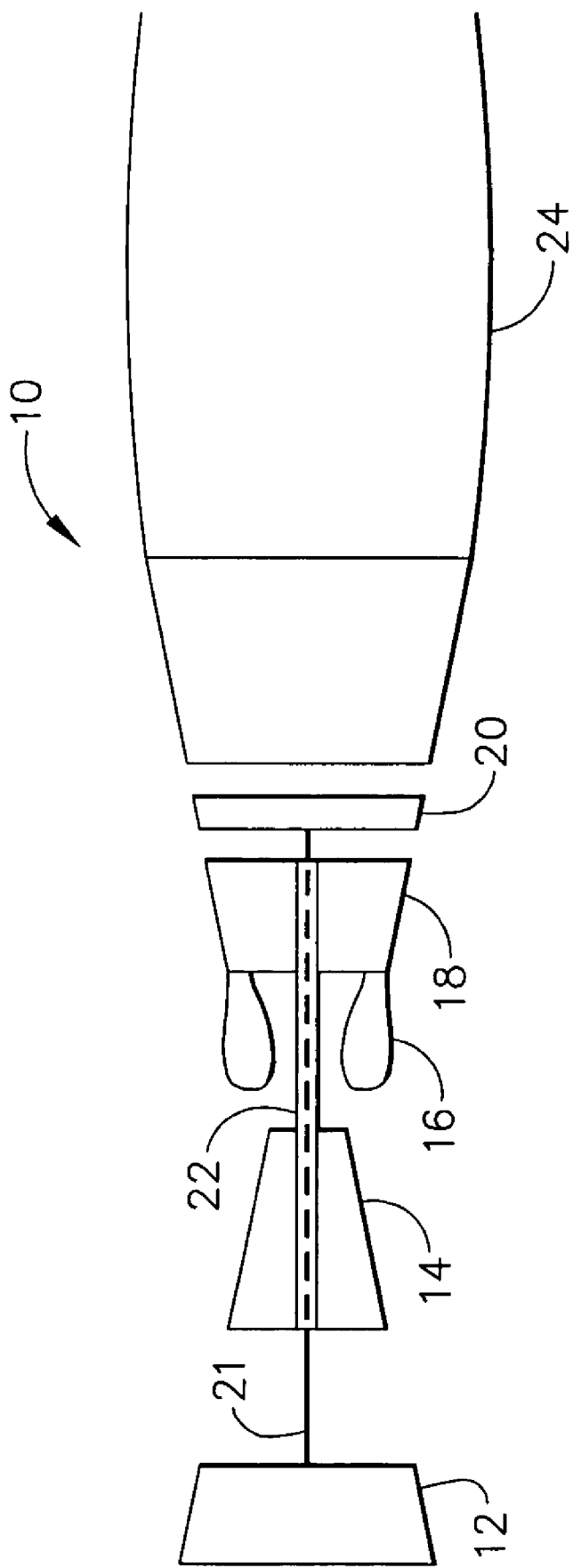
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is an LM2500 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle to drive turbines 18 and 20, prior to exiting gas turbine engine 10 through an exhaust nozzle 24. As is known in the art, gas turbine engines further include fuel nozzles (not shown) which supply fuel to the combustor 16.

Figure 2:
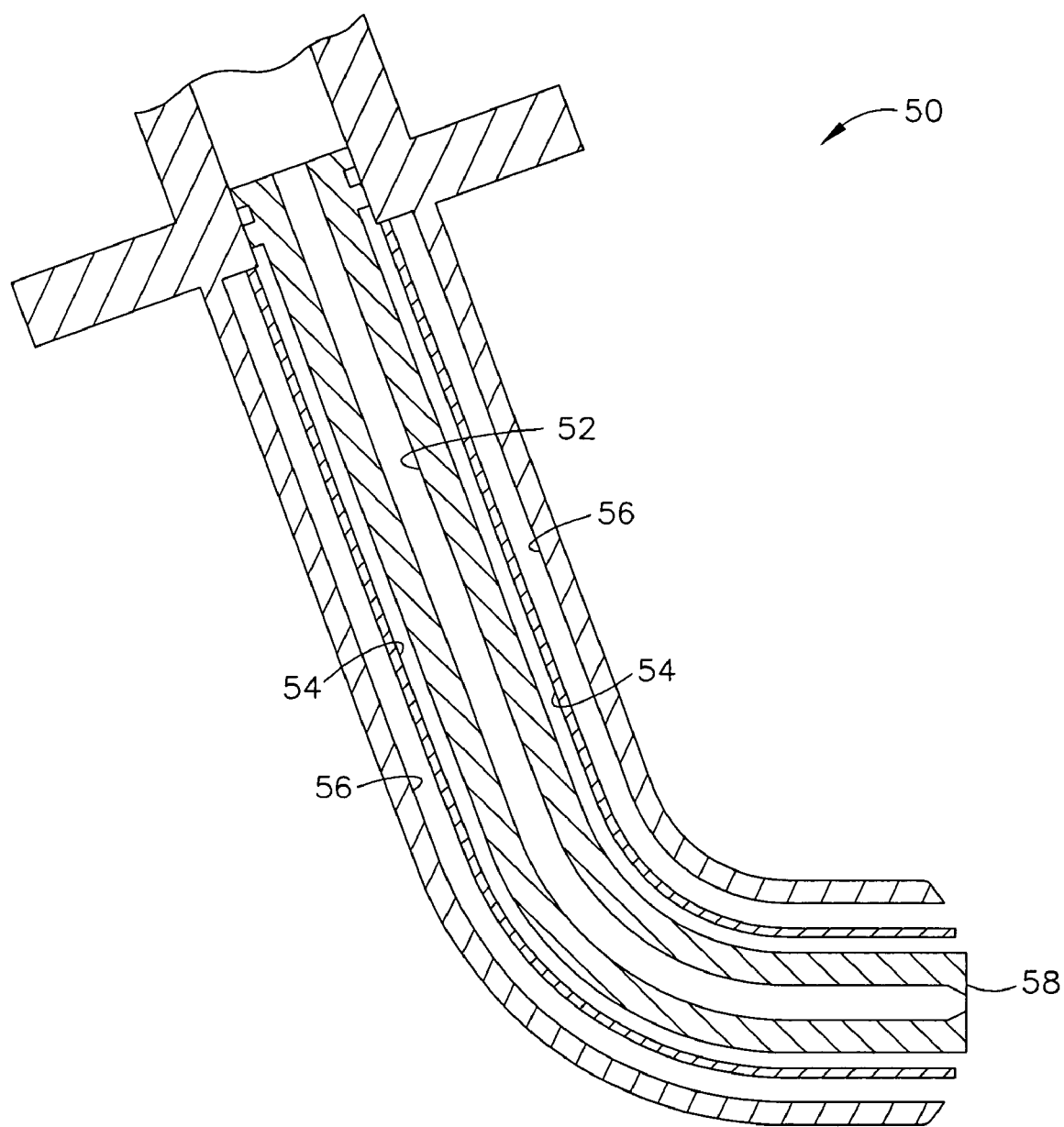
FIG. 2 is a side schematic cross-sectional view of an exemplary embodiment of a fuel nozzle that may be used with the gas turbine engine shown in FIG. 1.

FIG. 2 is a side schematic cross-sectional view of an exemplary embodiment of a fuel nozzle 50 that may be used with a gas turbine engine such as gas turbine engine 10 (shown in FIG. 1). Fuel nozzle 50 includes a pilot fuel circuit 52, a primary fuel circuit 54, and a steam circuit 56. Pilot fuel circuit 52 delivers pilot fuel through the center of nozzle 50 to the end 58 of nozzle 50 during start-up and idle operations. End 58 is configured to discharge pilot fuel into the combustor 16 (shown in FIG. 1) of gas turbine engine 10. Primary fuel circuit 54 and steam circuit 56 are positioned radially outward from, and circumferentially around, pilot fuel circuit 52. Primary fuel circuit 54 and steam circuit 56 deliver primary fuel and steam, respectively, to combustor 16 through nozzle end 58. More specifically, primary fuel and steam are each discharged through nozzle end 58 into a combustion zone defined downstream from nozzle 50 within combustor 16.

Figure 3:
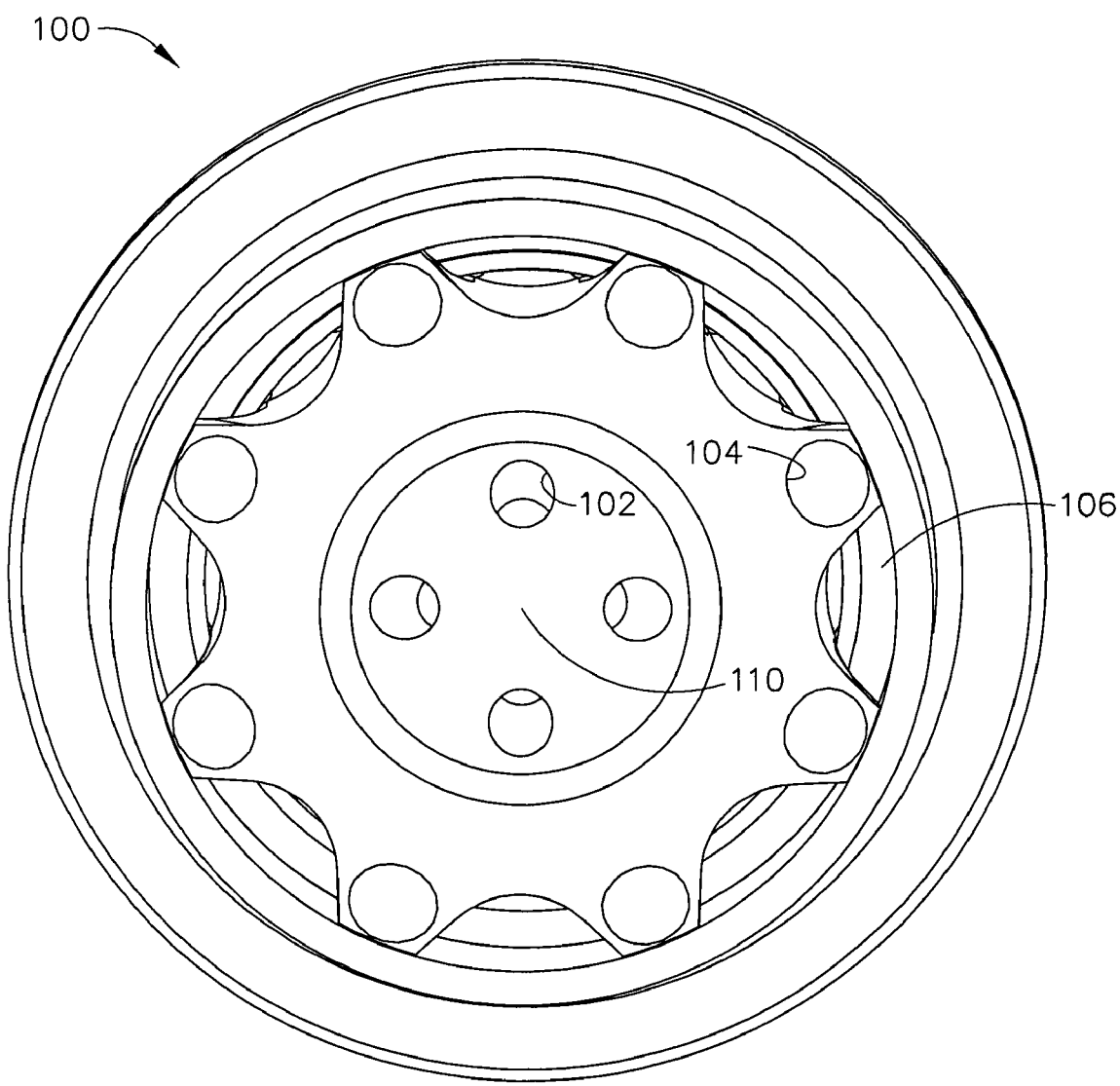
FIG. 3 is a front view of an exemplary fuel nozzle tip that may be used with the engine shown in FIG. 1.
Figure 4:
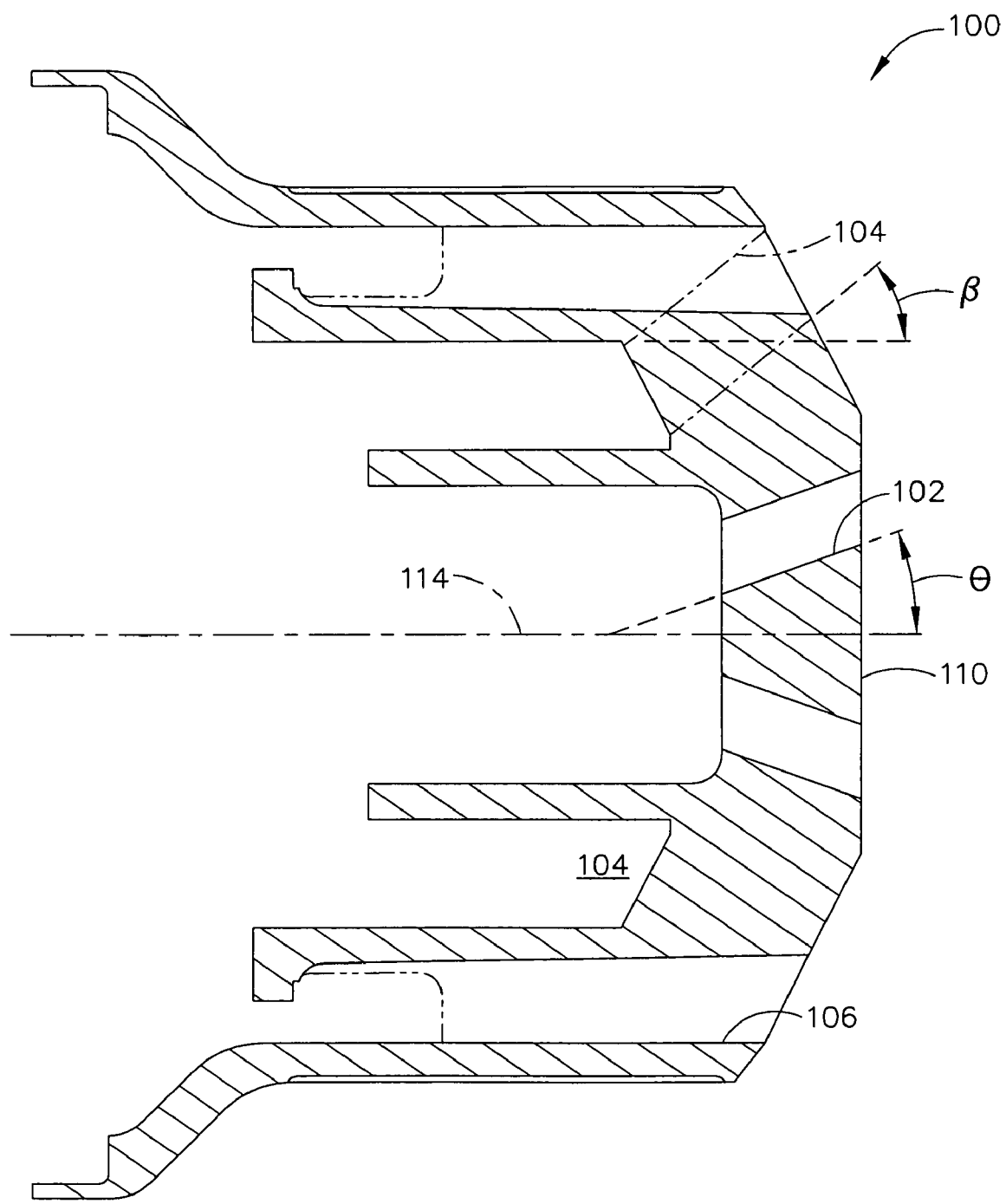
FIG. 4 is a cross-sectional view of an exemplary fuel nozzle tip shown in FIG. 3.

FIG. 3 is a front view of an exemplary fuel nozzle tip 100 that may be used with a fuel nozzle, such as nozzle 50 (shown in FIG. 2) to inject fluids into a gas turbine engine, such as turbine engine 10 (shown in FIG. 1). FIG. 4 is a cross-sectional view of fuel nozzle tip 100. In the exemplary embodiment, fuel nozzle tip 100 includes a plurality of pilot fuel outlets 102, a plurality of primary fuel outlets 104, and a plurality of steam outlets 106. Pilot fuel outlets 102 are spaced circumferentially about, and radially outward from, a center 110 of fuel nozzle tip 100. In one embodiment, pilot fuel outlets 102 are oriented in a "daisy-chain" configuration.

In the exemplary embodiment, pilot fuel outlets 102 are oriented obliquely with respect to a centerline 114 extending through nozzle tip 100. As such, pilot fuel discharged from outlets 102 is expelled outward from tip 100 at an oblique angle θ away from centerline 114 and towards steam being discharged from steam outlets 106. In the exemplary embodiment, nozzle tip 100 includes four pilot fuel outlets 102. In alternative embodiments, nozzle tip 100 includes more or less then four pilot fuel outlets 102. As will be appreciated by one of ordinary skill in the art, the number of pilot fuel outlets 102 varies depending on the application of fuel nozzle tip 100.

Primary fuel outlets 104 and steam outlets 106 are spaced circumferentially around, and radially outward from, pilot fuel outlets 102. More specifically, primary fuel outlets 104 and steam outlets 106 are oriented such that each primary fuel outlet 104 is positioned between an adjacent pair of steam outlets 106. Accordingly, outlets 104 and 106 are circumferentially aligned relative to each other. As such, and as described in more detail below, primary fuel and steam are discharged from fuel nozzle tip 100 at approximately the same radial position 112 relative to nozzle center 110.

During operation pilot outlets 102 discharge pilot fuel into the combustor during start up or idle operations of the gas turbine engine. When additional power is demanded, primary fuel outlets 104 and steam outlets 106 discharge both primary fuel and steam into a combustion zone defined in the combustor of the gas turbine engine. Primary fuel and steam are discharged from fuel nozzle tip 100 at approximately the same radial position 112 and at different discharge angles. More specifically, in the exemplary embodiment, steam outlets 106 are oriented substantially parallel to nozzle centerline 114 such that steam is discharged from tip 100 at a discharge angle that is substantially parallel to centerline 114, and primary fuel outlets 104 are oriented obliquely with respect to steam outlets 106 and centerline 114, such that primary fuel is discharged at a discharge angle β away from centerline 114. Because primary fuel and steam are discharged from approximately the same radial position 112 and at different discharge angles, mixing of the primary fuel and steam is enhanced as the constituents are discharged from nozzle tip 100. Moreover, the enhanced mixing of primary fuel and steam discharged from fuel nozzle tip 100 facilitates maintaining a more stable flame within a combustion zone defined in the combustor. Generally, controlling the stability of the flame facilitates reducing the generation of CO emissions within the combustor.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

The above described fuel nozzle tip for a gas turbine engine provides a dual fuel engine capable of meeting emissions standards. The fuel nozzle tip includes circumferentially-spaced primary fuel outlets and steam outlets that discharge primary fuel and steam at approximately the same radial position. As a result, the recirculation zone is pulled to the center of the combustor such that a more stable, lower emissions flame can occur. As such, a nozzle tip is provided that facilitates enhanced steam and fuel mixing, and reduced CO emissions in a cost effective and reliable manner.

Although the methods and systems described herein are described in the context of supplying fuel to a gas turbine engine, it is understood that the fuel nozzle tip methods and systems described herein are not limited to gas turbine engines. Likewise, the fuel nozzle tip components illustrated are not limited to the specific embodiments described herein, but rather, components of the fuel nozzle tip can be utilized independently and separately from other components described herein.

While the invention has been described in terms of various specific embodiments, those skilled in the art will recognize that the invention can be practiced with modification within the spirit and scope of the claims.

What is claimed is:

1. A method of operating a gas turbine engine comprising:
   supplying steam to a nozzle, the nozzle including a centerline extending through a nozzle tip;
   supplying primary fuel to the nozzle;
   discharging the steam into a combustor from a plurality of circumferentially-spaced steam outlets defined in the nozzle tip at a discharge angle that is substantially parallel to the nozzle centerline; and
   discharging the primary fuel into the combustor from at least one outlet that is spaced circumferentially between the steam outlets and circumferentially aligned with respect to the steam outlets.

2. A method as recited in claim 1 wherein discharging the steam into a combustor further comprises discharging the steam from a substantially circular nozzle tip that includes at least one pilot outlet spaced radially inward from the steam outlets for discharging pilot fuel into the combustor.

3. A method as recited with claim 2 wherein discharging the primary fuel into the combustor further comprises discharging the primary fuel from a plurality of primary fuel outlets that are spaced circumferentially about the at least one pilot outlet.

4. A method as recited with claim 1 further comprising discharging fuel from at least one pilot outlet that is configured to discharge pilot fuel into the combustor only during pre-selected engine operating conditions.

5. A method as recited in claim 4 wherein the nozzle includes a centerline extending though the tip, said discharging fuel from the at least one pilot outlet further comprises discharging pilot fuel from the nozzle tip at a discharge angle that is oblique relative to the nozzle centerline.

6. A method as recited in claim 5 wherein discharging the primary fuel into the combustor from at least one outlet further comprises discharging primary fuel from the nozzle tip at a discharge angle that is oblique relative to the nozzle centerline.

7. A nozzle tip for a turbine engine fuel nozzle, said tip comprising an annular body comprising:
   at least one pilot fuel outlet configured to discharge pilot fuel from said nozzle tip;
   a plurality of steam outlets configured to discharge steam from said nozzle tip, said plurality of steam outlets spaced circumferentially about said at least one pilot fuel outlet; and
   a plurality of primary fuel outlets configured to discharge primary fuel from said nozzle tip, said plurality of primary fuel outlets circumferentially aligned with said plurality of steam outlets.

8. A nozzle tip in accordance with claim 7 wherein each of said plurality of primary fuel outlets is positioned between a circumferentially-adjacent pair of said plurality of steam outlets.

9. A nozzle tip in accordance with claim 7 wherein said nozzle tip further comprises a centerline extending there through, said at least one pilot fuel outlet is spaced radially outward from said centerline.

10. A nozzle tip in accordance with claim 7 wherein said at least one pilot fuel outlet is positioned a first radial distance from a center of said nozzle tip, said plurality of steam outlets and said plurality of primary fuel outlets are each positioned a second radial distance from said nozzle tip center.

11. A nozzle tip in accordance with claim 10 wherein said first radial distance is shorter than said second radial distance.

12. A nozzle tip in accordance with claim 9 wherein said at least one pilot fuel outlet is configured to discharge pilot fuel from said nozzle tip at a discharge angle that is oblique with respect to said centerline extending through said nozzle tip.

13. A nozzle tip in accordance with claim 9 wherein said plurality of steam outlets are configured to discharge steam at a discharge angle that is substantially parallel to said centerline extending through said nozzle tip.

14. A nozzle tip in accordance with claim 7 wherein said plurality of fuel outlets and said plurality of steam outlets are oriented to facilitate enhanced mixing of steam and primary fuel downstream from said nozzle tip.

15. A gas turbine engine comprising:

a combustor; and a fuel nozzle comprising a nozzle tip, said nozzle tip comprising an annular body comprising: at least one pilot fuel outlet, a plurality of steam outlets, and a plurality of primary fuel outlets, said at least one pilot fuel outlet configured to discharge pilot fuel to said combustor only during pre-selected engine operations, said plurality of primary fuel outlets circumferentially aligned with respect to said plurality of steam outlets.

16. A gas turbine engine in accordance with claim 15 wherein each of said plurality of primary fuel outlets is positioned between a circumferentially-spaced adjacent pair of steam outlets.

17. A gas turbine engine in accordance with claim 15 wherein said fuel nozzle further comprises a centerline extending through said nozzle tip, said at least one pilot fuel outlet positioned a first radial distance from said nozzle tip, said plurality of steam outlets and said plurality of primary fuel outlets positioned a second radial distance from said nozzle tip.

18. A gas turbine engine in accordance with claim 17 wherein said second radial distance is longer than said first radial distance.

19. A gas turbine engine in accordance with claim 17 wherein said at least one pilot fuel outlet is oriented to discharge pilot fuel from said nozzle tip at a discharge angle that is oblique with respect to said centerline, said plurality of steam outlets are configured to discharge steam from said nozzle tip at a discharge angle that is substantially parallel to said centerline.

20. A gas turbine engine in accordance with claim 15 wherein said plurality of steam outlets and said plurality of primary fuel outlets are oriented to facilitate mixing of steam and primary fuel downstream from said nozzle tip.

* * * * *